United States Patent
Oda

(10) Patent No.: US 11,479,254 B2
(45) Date of Patent: Oct. 25, 2022

(54) DRIVING FORCE CONTROL APPARATUS FOR VEHICLE

(71) Applicant: TOYOTA JIDOSHA KABUSHIKI KAISHA, Toyota (JP)

(72) Inventor: Yoshikatsu Oda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 16/854,456

(22) Filed: Apr. 21, 2020

(65) Prior Publication Data

US 2020/0331474 A1 Oct. 22, 2020

(30) Foreign Application Priority Data

Apr. 22, 2019 (JP) .................................. 2019-081050

(51) Int. Cl.
*B60W 30/188* (2012.01)
*B60W 10/04* (2006.01)
(Continued)

(52) U.S. Cl.
CPC ........ *B60W 30/1882* (2013.01); *B60W 10/04* (2013.01); *B60W 40/076* (2013.01);
(Continued)

(58) Field of Classification Search
CPC ............. B60W 30/1882; B60W 10/04; B60W 40/074; B60W 2050/0011;
(Continued)

(56) References Cited

U.S. PATENT DOCUMENTS 4,492,195 A * 1/1985 Takahashi ........... F02D 41/1401
123/680
4,757,886 A * 7/1988 Brown .................. F16H 61/143
192/3.3
(Continued)

FOREIGN PATENT DOCUMENTS

JP 2014088067 A 5/2014

OTHER PUBLICATIONS

Specification of U.S. Appl. No. 16/276,022, 34 pages.

*Primary Examiner* — Mahmoud Gimie
(74) *Attorney, Agent, or Firm* — Hunton Andrews Kurth LLP

(57) ABSTRACT

The driving force ECU calculates a restricted driving force for a driving force restricting control, by using a Proportional-Integral-Differential control formula which utilizes a difference between a target acceleration varied depending on a vehicle speed and an actual acceleration of the vehicle. The driving force ECU adjusts (changes) a proportion gain K1 of the Proportional-Integral-Differential control formula based on an inclination angle θ of a road in such a manner that a value of the proportion gain K1 used when the inclination inclination angle θ is relatively large is smaller than a value of the proportion gain K1 used when the inclination inclination angle θ is relatively small. The driving force ECU performs a driving force restricting control by selecting, as a target driving force used for the driving force restricting control, a pedal required driving force or the restricted driving force, whichever is smaller.

8 Claims, 10 Drawing Sheets

(51) Int. Cl.
*B60W 40/076* (2012.01)
*B60W 50/00* (2006.01)

(52) U.S. Cl.
CPC ............... *B60W 2050/0011* (2013.01); *B60W 2050/0022* (2013.01); *B60W 2050/0026* (2013.01); *B60W 2520/105* (2013.01); *B60W 2540/10* (2013.01); *B60W 2552/15* (2020.02)

(58) Field of Classification Search
CPC . B60W 2050/0022; B60W 2050/0026; B60W 2552/15; B60W 2520/105; B60W 2540/10
USPC ........................................................ 701/102
See application file for complete search history.

(56) References Cited

U.S. PATENT DOCUMENTS

| | | | | |
|---|---|---|---|---|
| 5,179,875 | A * | 1/1993 | Brown | F16H 61/061 477/154 |
| 9,175,610 | B2 * | 11/2015 | Takagi | F02D 11/106 |
| 2013/0006490 | A1 * | 1/2013 | Takagi | B60W 30/18063 701/99 |

* cited by examiner proportion gain
K1: Large
Flat road proportion gain
K1: Large
Inclined road proportion gain
K1: Small
Flat road proportion gain
K1: Small
Inclined road

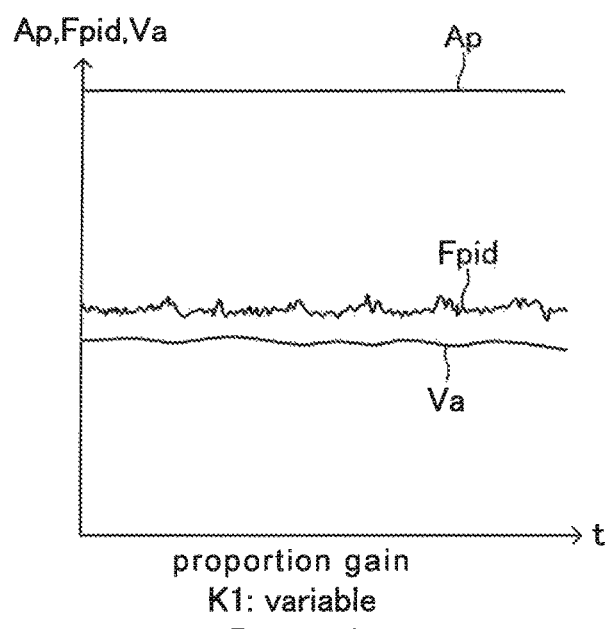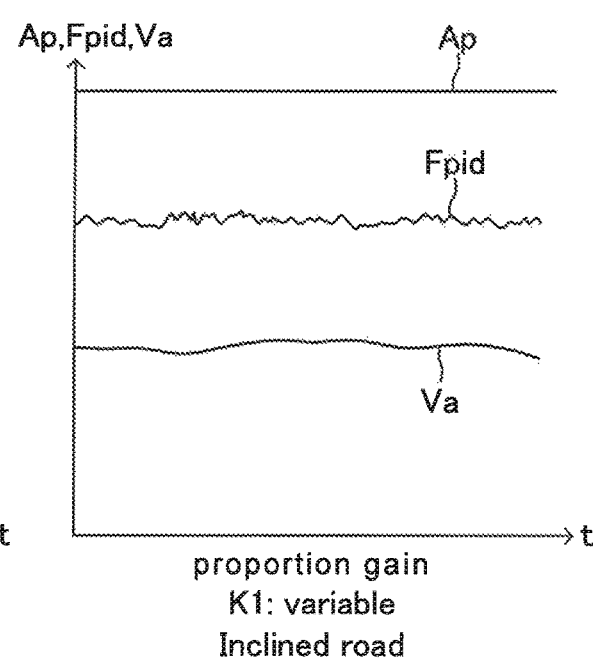
FIG. 11A — proportion gain K1: variable, Flat road
FIG. 11B — proportion gain K1: variable, Inclined road

DRIVING FORCE CONTROL APPARATUS FOR VEHICLE

CROSS-REFERENCE TO RELATED APPLICATION

This application claims priority to Japanese Patent Application No. 2019-081050 filed on Apr. 22, 2019, which is incorporated herein by reference in its entirety.

BACKGROUND OF THE INVENTION

1. Field of the Invention

The present disclosed apparatus relates to a driving force control apparatus for controlling a driving force of a vehicle based on an operation amount of an acceleration pedal (or an acceleration pedal operation amount).

2. Description of the Related Art

There has been known a control to restrict a driving force (driving force restricting control) executed when an erroneous acceleration operation is detected. The erroneous acceleration operation is an unintended operation for the acceleration pedal performed by a driver.

Typically, a driving force control apparatus controls a driving force which a driving force generating device generates based on the acceleration pedal operation amount. Therefore, when the driver erroneously/mistakenly performs the acceleration pedal operation, the vehicle may suddenly be accelerated against the driver's intention. The driving force restricting control restricts the driving force which the driving force generating device generates when the erroneous acceleration operation by the driver is detected so that the sudden acceleration of the vehicle can be avoided.

For instance, one of the proposed driving force restricting control apparatuses (hereinafter, referred to as "a conventional apparatus") disclosed in Japanese Patent Application Laid-Open (Kokai) No. 2014-88067 is configured to perform the driving force restricting control when the acceleration pedal operation amount is larger than zero and a shift position is in the R (reverse) position. Thus, the conventional apparatus can prevent the sudden acceleration of the vehicle when the driver erroneously/mistakenly presses the acceleration pedal greatly while the vehicle runs backwards.

Furthermore, the conventional apparatus is configured to perform the driving force restricting control when the shift position has been changed along a predetermined pattern while the acceleration pedal operation amount is larger than zero. For instance, while the acceleration pedal operation amount is larger than zero, the driving force restricting control is performed when:

(1) the shift position is changed from the P (parking) position to the D (driving) position or to the R (reverse) position;
(2) the shift position is changed from the R position to the D position; or
(3) the shift position is changed from the N (neutral) position to the R position.

Accordingly, even if the driver changes the shift position while erroneously/mistakenly pressing the acceleration pedal in place of the brake pedal, the sudden start/movement of the vehicle can be prevented.

Furthermore, the conventional apparatus is configured to determine a target acceleration varying depending on a vehicle speed, and to transfer the target acceleration into a restricted driving force as a target driving force which the driving force generating device is controlled to generate when performing the driving force restricting control.

SUMMARY OF THE INVENTION

However, the conventional apparatus which has been configured to set the target driving force to the restricted driving force to perform the driving force restricting control is hard to control the vehicle stably for both a flat road and an inclined road (an ascending slope). For instance, in a case where the conventional apparatus is configured to calculate the restricted driving force through a feedback control using a difference between a target acceleration and an actual acceleration, when a control gain which is appropriate for the driving force restricting control for the flat road is used for the driving force restricting control for the inclined road, the vehicle speed may greatly fluctuate.

The present invention has been made to solve the above-mentioned problems. That is, an object of the present invention is to provide a driving force control apparatus which can realize the driving force restricting control with ensuring good performance for not only the flat road but also for the inclined road.

The present disclosed apparatus has been made to solve the above-mentioned problems. That is, the present disclosed apparatus is a driving force control apparatus of a vehicle comprising:

a driving force generating device (20) configured to generate a driving force applied to the vehicle; and a control unit (10) configured to control the driving force generating device to make the driving force generating device generate a driving force equal to a pedal required driving force which is a target driving force varied depending on an acceleration pedal operation amount (S30), the control unit being configured to:

detect a specific operation by a driver, the specific operation being an operation which has a probability of causing the vehicle to make a movement which is not along an expectation of the driver and has been defined in advance (S10), calculate a restricted driving force for imposing a limitation on the pedal required driving force, based on a feedback control formula which uses a difference between a target value of a moving state parameter indicative of a moving state of the vehicle and an actual value of the moving state parameter (S45);

perform a driving force restricting control to control the driving force generating device in such a manner that the driving force generated by the driving force generating device does not exceed the calculated restricted driving force, when the specific operation is detected (S40, S46, S47), wherein, the control unit is further configured to:

acquiring an inclination parameter indicative of an inclination in a vehicle traveling direction of a road on which the vehicle is present (S41); and adjusting a control gain employed in the feedback control formula based on the inclination parameter in such a manner that a value of the control gain used when the inclination parameter is a first magnitude is smaller than a value of the control gain used when the inclination parameter is a second magnitude smaller than the first magnitude (S42).

In other words, the disclosed apparatus comprises,
the driving force generating device (20);

a driving force control section for controlling the driving force generating device to make the driving force generating device generate a driving force equal to a pedal required driving force which is a target driving force varied depending on an acceleration pedal operation amount (S30), a specific operation detecting section for detecting a specific operation by a driver, the specific operation being an operation which has a probability of causing the vehicle to make a movement which is not along an expectation of the driver and has been defined in advance (S10);

a restricted driving force calculating section for calculating a restricted driving force for imposing a limitation on the pedal required driving force, based on a feedback control formula which uses a difference between a target value of a moving state parameter indicative of a moving state of the vehicle and an actual value of the moving state parameter (S45);

a driving force restricting control execution section for performing a driving force restricting control to control the driving force generating device in such a manner that the driving force generated by the driving force generating device does not exceed the calculated restricted driving force, when the specific operation is detected (S40, S46, S47).

The disclosed apparatus further comprises, an inclination acquiring/obtaining section for acquiring/obtaining an inclination parameter ($\theta$) indicative of an inclination in a vehicle traveling direction of a road on which the vehicle is present (S41); and an gain adjusting section for adjusting a control gain employed in the feedback control formula based on the inclination parameter in such a manner that a value of the control gain used when the inclination parameter is a first magnitude is smaller than a value of the control gain used when the inclination parameter is a second magnitude smaller than the first magnitude (S42).

The present disclosed apparatus imposes a limit on (restricts) the driving force generated by the driving force generating device when the driver performs an operation which does not along with the driver's intention, so as to prevent the vehicle from accelerating greatly or starting to move quickly. In order to do so, the present disclosed apparatus comprises, in addition to the driving force control section, the specific operation detecting section, the restricted driving force calculating section, the driving force restricting control execution section.

The driving force control section performs a driving force control to make the driving force generating device generate a driving force equal to a pedal required driving force which is a target driving force varied depending on an acceleration pedal operation amount. It is preferable that the pedal required driving force be determined/set based on not only the acceleration pedal operation amount but also, for instance, a vehicle speed (speed of the vehicle).

The specific operation detecting section detects the specific operation by the driver. The specific operation is an operation which has a probability of causing the vehicle to make a movement which is not along an expectation of the driver (or is against the driver's intention) and has been defined in advance. For instance, when the driver intends to back the vehicle (or to move the vehicle backward), the driver may erroneously/mistakenly press the acceleration pedal in place of the brake pedal. In such a case, the vehicle starts to move quickly backward against the driver's expectation. In other case, the driver may change the shift position while the driver is pressing mistakenly the acceleration pedal in place of the brake pedal. In this case, the vehicle may start to move quickly depending on a pattern of the shift changes. The specific operation detecting section detects such a driver's specific operation which may cause unintentional vehicle movement (in other words, which may generate excessively large driving force with respect to the driver's expectation).

It should be noted that the specific operation is not limited to the above examples. In addition, the specific operation detecting section may be configured to detect only one kind of the specific operation.

The restricted driving force calculating section calculates the restricted driving force for imposing a limitation on the pedal required driving force, based on a feedback control formula which uses a difference between a target value of a moving state parameter indicative of a moving state of the vehicle and an actual value of the moving state parameter. For instance, the restricted driving force may be a force which controls the vehicle speed in such a manner that the vehicle speed becomes equal to or lower than a predetermined speed. As long as the restricted driving force is calculated based on a control formula which includes the feedback control formula, the restricted driving force may be calculated based on a formula which includes a feedforward term.

When the specific operation is detected, the driving force restricting control execution section for performing the driving force restricting control to control the driving force generating device in such a manner that the driving force generated by the driving force generating device does not exceed the calculated restricted driving force. This can prevent the sudden start of the vehicle and/or the sudden acceleration of the vehicle which is/are otherwise caused by the erroneous/mistaken driver's operation (i.e., the specific operation). It is preferable that the driving force restricting control execution section be configured to employ, as a (final) target driving force, either the restricted driving force or the pedal required driving force, whichever is smaller, so as to perform the the driving force restricting control using the thus employed target driving force.

Meanwhile, when the specific operation is detected on an inclined road (ascending slope), the driving force restricting control is also executed. When the driving force restricting control is executed while the vehicle is on the inclined road, not only the driving force (to climb up) is restricted but also a gravity force component toward the descending direction due to a weight of the vehicle is applied to the vehicle. Therefore, if a control gain of the feedback control formula has been set/determined in advance such that the control gain is suitable for the flat road, the control gain may be excessively large for the inclined road. This deteriorates the controllability. That is, for example, hunting (fluctuation) of vehicle speed may occur. In view of the above, the present disclosed apparatus comprises the inclination acquiring/obtaining section and the gain adjusting section.

The inclination acquiring/obtaining section acquires/obtains the inclination parameter ($\theta$) indicative of the inclination in the vehicle traveling direction of the road on which the vehicle is present (or the magnitude of the inclination of the running road of the vehicle). The gain adjusting section adjusts/changes the control gain employed in the feedback control formula based on the inclination parameter in such a manner that a value of the control gain used when the inclination parameter is a first magnitude (relatively large) is smaller than a value of the control gain used when the inclination parameter is a second magnitude (relatively small) which is smaller than the first magnitude. This allows the present disclosed apparatus to set the control gain to an appropriate value for the inclination of the road. Consequently, the present disclosed apparatus can secure good controllability of the driving force restricting control not only on the flat road but also on the inclined road. Accordingly, the hunting (fluctuation) of vehicle speed can be suppressed not only on the flat road but also on the inclined road.

In some embodiments, the control unit is configured to:
employ, as the feedback control formula, a Proportional-Integral-Differential control formula; and
adjust, a proportion gain serving as the control gain for a proportional term included in the Proportional-Integral-Differential (PID) control formula.

In other words, the feedback control formula used for the driving force restricting control is the PID control formula that includes a proportional term, an integral term and a derivative term, and at least the proportion gain serving as the control gain for the proportional term included in the Proportional-Integral-Differential (PID) control formula is varied depending of the inclination parameter.

In the above embodiment, the restricted driving force is calculated according to the PID control formula, and the control gain (proportion gain) for the proportional term included in the PID control formula. This can suppress the hunting (fluctuation) of vehicle speed not only on the flat road but also on the inclined road.

In some embodiments, the control unit is configured to:
employ, as the moving state parameter, the acceleration of the vehicle; and
determine the target value of the moving state parameter based on the speed of the vehicle (i.e., the vehicle speed)

In the above embodiment, the target acceleration is set in response to the vehicle speed, and the restricted driving force is calculated according to the feedback control formula using a difference/deviation between that target acceleration and the actual acceleration of the vehicle. Therefore, the appropriate restricted driving force can be calculated.

In some embodiments, the control unit is configured to:
select, as a final target driving force, the pedal required driving force or the restricted driving force, whichever is smaller; and
perform the driving force restricting control by causing the driving force generating device to generate a driving force equal to the selected final target driving force.

In other words, the driving force restricting control execution section is configured to set the target driving force to either the pedal required driving force or the restricted driving force, whichever is smaller, to execute the driving force restricting control.

Therefore, the driving force restricting control using the appropriate restricted driving force can be realized.

In the above description, references used in the following descriptions regarding embodiments are added with parentheses to the elements of the present disclosed apparatus, in order to assist in understanding the present disclosed apparatus. However, those references should not be used to limit the scope of the present disclosed apparatus.

BRIEF DESCRIPTION OF DRAWINGS

FIG. 11A and FIG. 11B is a chart showing the vehicle speed, the PID control driving force, and the acceleration pedal operation amount, when the proportion gain is varied/adjusted.

DETAILED DESCRIPTION OF THE EMBODIMENT

A driving force control apparatus for a vehicle according to an embodiment of the present invention will next be described with reference to the drawings.

Figure 1:
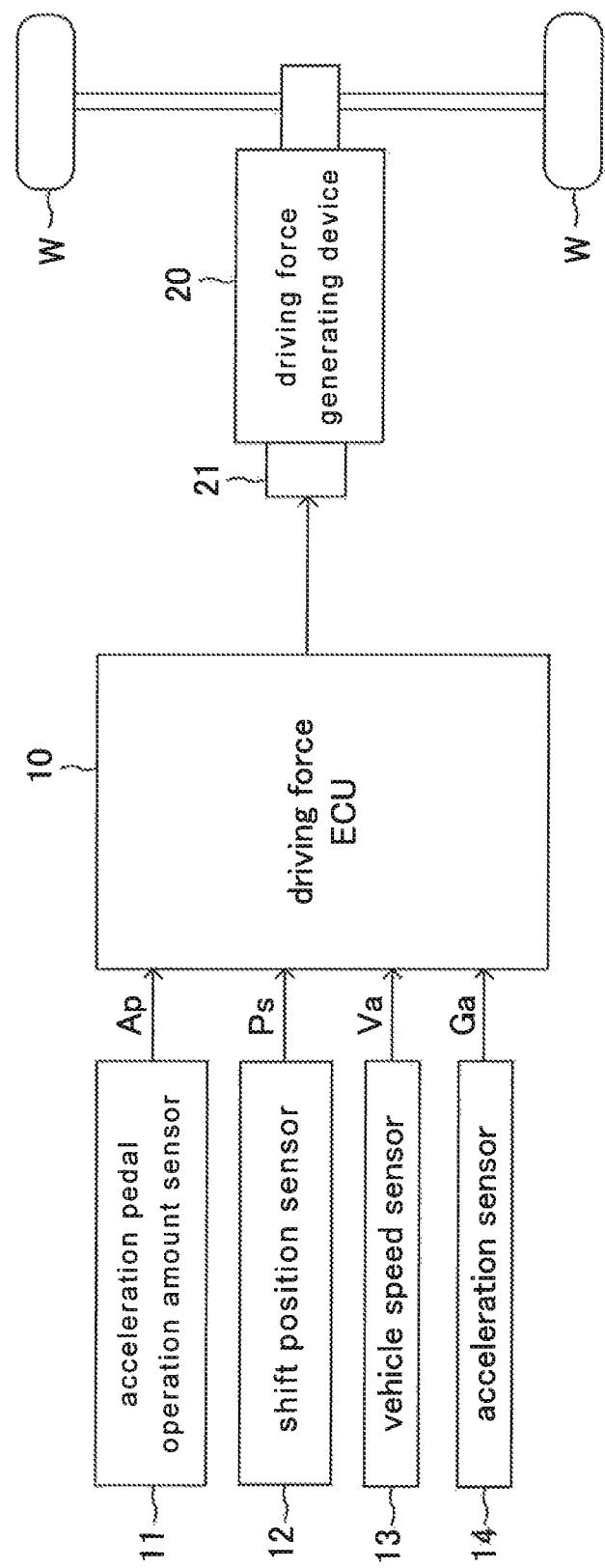
FIG. 1 is a system configuration diagram of a driving force control apparatus for a vehicle according to an embodiment of the present disclosure.

FIG. 1 shows a schematic configuration of the driving force control apparatus for a vehicle according to the embodiment of the present invention. The driving force control apparatus is installed in the vehicle and includes a driving force ECU 10. Hereinafter, the driving force ECU 10 is simply referred to as "an ECU 10".

The ECU 10 is an electric control unit having a micro-computer (or a processor) as a main component. In the present specification, the micro-computer includes a CPU, a ROM, a RAM, a non-volatile memory, and an interface I/F. The CPU is configured to execute instructions (programs, routines) stored in the ROM so as to realize various functions.

The ECU 10 is connected to an actuator 21 of a driving force generating device 20 of the vehicle. The driving force generating device 20 is a driving device for a hybrid vehicle, for example. In other words, the driving force generating device 20 comprises a driving source including an internal combustion engine and a motor, and a driving mechanism including a gear device. The ECU 10 controls/drives the actuator 21 to change the torque which the driving force generating device 20 generates. The actuator 21 includes a throttle valve for controlling the torque generated by the internal combustion engine and a motor driving circuit for controlling the torque generated by the motor. The torque generated by the driving source is transferred to driving wheels W as a driving force for the vehicle through the driving mechanism.

The torque generated by the driving source is transferred to the driving wheels W without being torque-converted through the driving mechanism in the present embodiment. Thus, the torque generated by the driving source is equal to a torque applied to the driving wheels W (that is the driving force for the vehicle). The driving mechanism is configured to change/switch the driving force transmitted to the driving wheels W either to the driving force which moves the vehicle forward or to the driving force which moves the vehicle backward.

An acceleration pedal operation amount sensor 11, a shift position sensor 12, a vehicle speed sensor 13, and an acceleration sensor 14 are connected to the ECU 10.

The acceleration pedal operation amount sensor 11 detects an operation amount of an unillustrated acceleration pedal of the vehicle to output a detection signal indicative of the acceleration pedal operation amount Ap. The ECU 10 reads out (fetches) the acceleration pedal operation amount Ap from the acceleration pedal operation amount sensor 11 every elapse of a short interval.

The ECU 10 determines that the acceleration pedal is being operated (or is in an operation state) when the acceleration pedal operation amount Ap is equal to or larger than an acceleration pedal operation amount threshold Ap0 which is greater than a predetermined positive value. The ECU 10 determines that the acceleration pedal is not being operated (or is in a non-operation state) when the acceleration pedal operation amount Ap is smaller than the acceleration pedal operation amount threshold Ap0.

The shift position sensor 12 detects a shift positon of an unillustrated shift lever to output a detection signal indicative of the shift position Ps. The ECU 10 reads out (fetches) the shift position Ps from the shift position sensor 12 every elapse of a short interval.

The vehicle speed sensor 13 outputs a detection signal indicative of a vehicle speed (which is a vehicle body speed) Va. The vehicle speed sensor 13 may be wheel speed sensors of the four wheels (a front left wheel, a front right wheel, a rear left wheel, and a rear right wheel). The vehicle speed may be a speed calculated based on detection signals from those wheel speed sensors. The ECU 10 reads out (fetches) the vehicle speed Va from the vehicle speed sensor 13 every elapse of a short interval.

The acceleration sensor 14 outputs a detection signal indicative of an acceleration Ga of the vehicle in a front-rear direction of the vehicle (or along a direction of a front-rear axis of the vehicle body). The ECU 10 reads out (fetches) the acceleration Ga from the acceleration sensor 14 every elapse of a short interval.

<<Pedal Required Driving Force Control>>

The ECU 10 calculates a pedal required driving force Fp which is a target driving force set/determined depending on (in response to) the acceleration pedal operation amount Ap. Typically, the target driving force set/determined depending on (in response to) the acceleration pedal operation amount Ap is referred to as a driver requiring driving force. However, since the driver may perform the acceleration pedal operation against his/her intention, the target driving force set/determined depending on the acceleration pedal operation amount Ap is referred to as the pedal required driving force Fp in the present specification.

Figure 2:
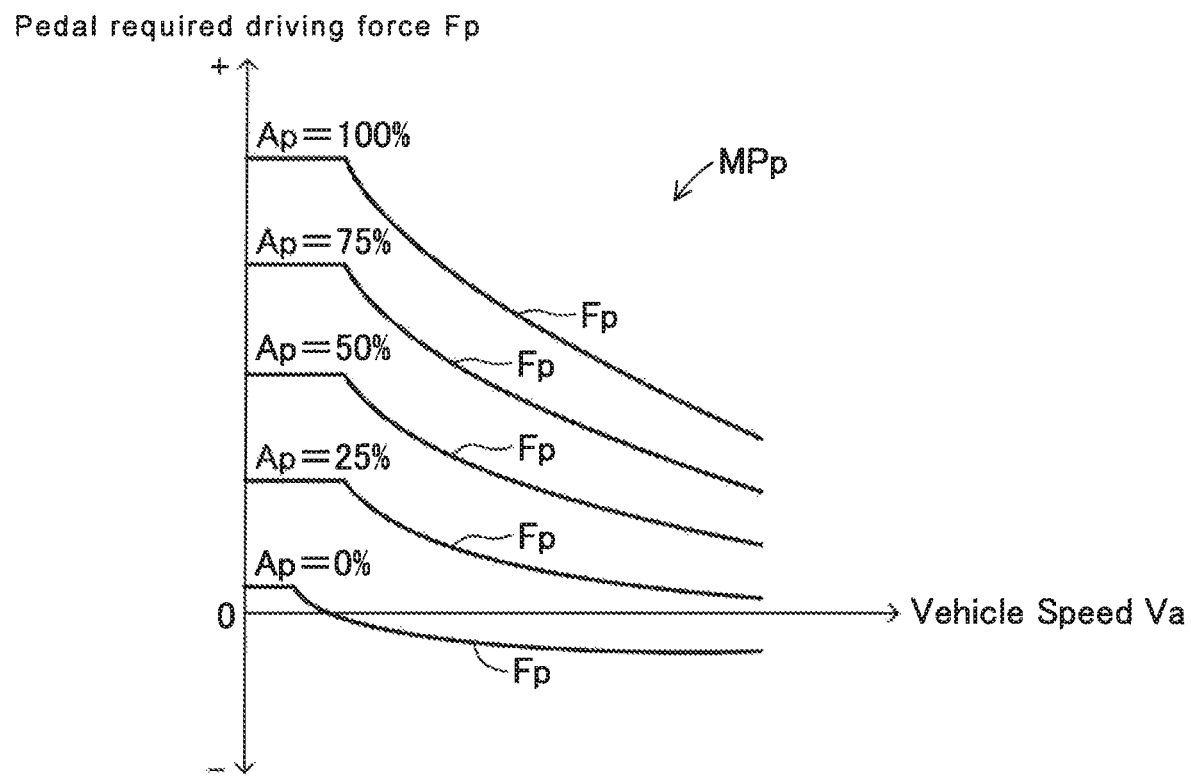
FIG. 2 is a graph showing a pedal required driving force map (look-up table).

In the present embodiment, the pedal required driving force Fp is calculated in response to the acceleration pedal operation amount Ap and the vehicle speed Vs. For instance, the ECU 10 has stored a pedal required driving force map (look up table) MPp as shown in FIG. 2 and determines/calculates the pedal required driving force Fp referring to the pedal required driving force map MPp. The pedal required driving force Fp is obtained by applying the acceleration pedal operation amount Ap and the vehicle speed Va to the pedal required driving force map MPp. According to the pedal required driving force map MPp, the pedal required driving force Fp becomes larger as the acceleration pedal operation amount Ap becomes larger, and the pedal required driving force Fp becomes smaller as the vehicle speed Va becomes higher.

It should be noted that the pedal required driving force map MPp shown in FIG. 2 is a mere example. In other words, any pedal required driving force map MPp can be used as long as the pedal required driving force Fp is determined/calculated in such a manner that the pedal required driving force Fp becomes larger as the acceleration pedal operation amount Ap becomes larger. In addition, FIG. 2 shows the pedal required driving forces Fp for five acceleration pedal amounts Ap (i.e., 0%, 25%, 50%, 75%, and 100% of the full acceleration pedal operation amount Apmax) for illustrative purposes, however, in reality, the pedal required driving forces Fp for the more acceleration pedal amounts Ap are defined in the pedal required driving force map MPp.

The ECU 10 controls the actuator 21 in such a manner that the driving force generating device 20 generates a force equal to the calculated/determined pedal required driving force Fp when a specific operation described later is not detected. This control may be referred to as "a pedal required driving force control".

<<Driving Force Restricting Control>>

When the ECU 10 detects the driver's specific operation, it performs the driving force restricting control. The specific operation is an operation which may cause the vehicle to make a movement which is not along an expectation of said driver (or to move against driver's intention), and has been defined in advance. When performing the driving force restricting control, the ECU 10 calculates a restricted driving force which is a target driving force that is set/determined in such a manner that the driving force generated by the driving force generating device 20 is limited/restricted so as not to exceed an upper limit. The restricted driving force is the target driving force to prohibit the driving force generating device 20 from generating the pedal required driving force Fp so that the vehicle speed is equal to or lower than a predetermined speed.

When performing the driving force restricting control, the ECU 10 selects, as a final target driving force, one of the restricted driving force and the pedal required driving force Fp, whichever is smaller, and controls the actuator 21 in such a manner that the driving force generating device 20 generates the (final) target driving force.

The ECU 10 determines that one of specific operations has been performed when one of specific conditions described below is satisfied, so as to perform the driving force restricting control. The specific operation is an operation that may cause the vehicle to move differently than the driver's expectation/intention, and is, especially, an operation that may generate the driving force greater than the driver's expecting driving force.

The specific conditions include a shift changing timing specific condition and a backward moving timing specific condition.

The shift changing timing specific condition is satisfied for a period from a time point at which "an SC timing driving force restricting control start condition" described later becomes satisfied to a time point at which "an SC timing driving force restricting control end condition" described later becomes satisfied.

The backward moving timing specific condition is the same as "an R driving force restricting control execution condition" described later.

<SC Timing Driving Force Restricting Control>

When the driver changes the shift position while the driver is pressing the brake pedal, the vehicle does not start to move quickly. Generally, the driver performs such operations. However, the driver may sometimes change the shift position while the driver is erroneously/mistakenly pressing the acceleration pedal in place of the brake pedal. In such a case, the vehicle starts to move quickly against the driver's expectation. In view of the above, when such an erroneous/mistaken operation is performed, the ECU 10 executes the driving force restricting control referred to as an SC timing driving force restricting control to prevent the vehicle from starting to move quickly/suddenly.

(SC Timing Driving Force Restricting Control Start Condition)

The ECU 10 starts the SC timing driving force restricting control when the SC timing driving force restricting control start condition becomes satisfied. The SC timing driving force restricting control start condition becomes satisfied when both of a (first) start condition SCstart1 and a (second) start condition SCstart2 become satisfied.

The start condition SCstart1: the acceleration pedal operation amount Ap is equal to or larger than an SC timing driving force restricting control start threshold Ap1 (Ap≥AP1).

The start condition SCstart2: the shift position Ps has been changed in/along any one of five patterns 1-5 described below.

Pattern 1: a change from the P positon to the R position
Pattern 2: a change from the N positon to the R position
Pattern 3: a change from the P positon to the D position
Pattern 4: a change from the D positon to the R position
Pattern 5: a change from the R positon to the D position The SC timing driving force restricting control start threshold Ap1 may be set to an arbitrary value equal to or larger than the acceleration pedal operation amount threshold Ap0 which allows the ECU 10 determine that the acceleration pedal is in the operation state (operated, pressed). For instance, the SC timing driving force restricting control start threshold Ap1 may be equal to the acceleration pedal operation amount threshold Ap0.

The P positon means the parking position.
The N positon means the neutral position.
The D positon means the driving/drive position.
The R positon means the reverse position.

For example, the SC timing driving force restricting control start condition becomes satisfied when the driver operates the shift lever in such a manner that the shift position has been changed according to one of the above patterns 1-5, while the driver is pressing the acceleration pedal.

(SC Timing Driving Force Restricting Control End Condition)

The ECU 10 ends/terminates the SC timing driving force restricting control when the SC timing driving force restricting control end condition becomes satisfied. The SC timing driving force restricting control end condition becomes satisfied when at least one of an (first) end condition SCend1 and a (second) end condition SCend2 becomes satisfied.

The end condition SCend1: A state of the acceleration peal has changed from the operation state to the non-operation state. In other words, the acceleration pedal operation amount Ap becomes lower than the acceleration pedal operation amount threshold Ap0 (Ap<Ap0) (from the amount larger than the acceleration pedal operation amount threshold Ap0).

The end condition SCend2: The shift position Ps has been changed to a position different from the shift position at the time of the start of the SC timing driving force restricting control.

It should be noted that, when the end condition SCend 2 becomes satisfied while the acceleration pedal is in the operation state so that the SC timing driving force restricting control end condition becomes satisfied, there may be a case where the SC timing driving force restricting control start condition becomes satisfied since the start condition SCstart 2 become satisfied at the same time. In this case, the SC timing driving force restricting control is continued.

(SC Timing Restricted Driving Force)

When performing the SC timing driving force restricting control, the ECU 10 calculates the SC timing restricted driving force (as the target driving force). The SC timing restricted driving force continues to be calculated as described below in a period in which the shift changing timing specific condition is satisfied (i.e., in a period from the time point at which the SC timing driving force restricting control start condition becomes satisfied to the time point at which the SC timing driving force restricting control end condition becomes satisfied). In contrast, in a period in which the shift changing timing specific condition is not satisfied, the SC timing restricted driving force is set to an extraordinary large value which the driving force generated by the driving force generating device 20 can never reach.

Figure 3:
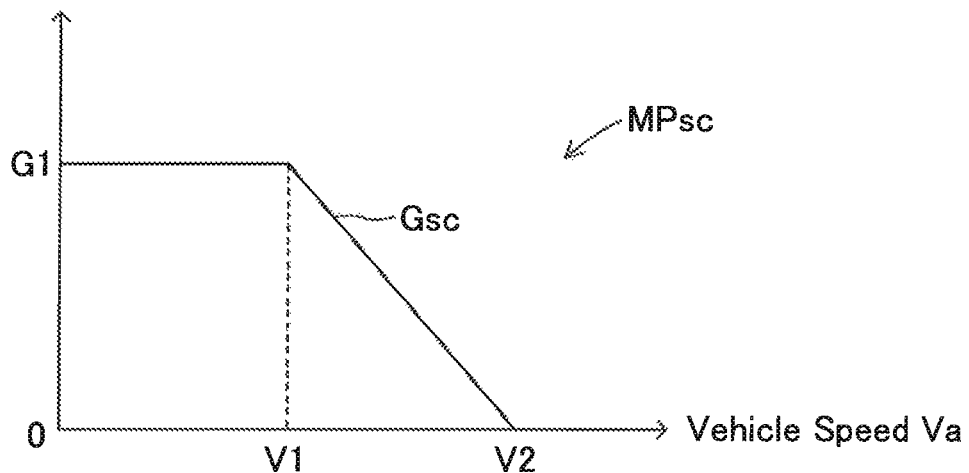
FIG. 3 is a graph showing an SC timing restricted target acceleration map (look-up table).

The ECU 10 calculates an SC timing restricted target acceleration Gsc which is a target value of an acceleration of the vehicle (i.e., moving state parameter) in order to calculate the SC timing restricted driving force. The ECU 10 has stored an SC timing restricted target acceleration map (lookup-table) MPsc shown in FIG. 3 in the ROM, and uses (refers to) the SC timing restricted target acceleration map MPsc to calculate the SC timing restricted target acceleration Gsc. The SC timing restricted target acceleration map MPsc is a map defining a relationship between the vehicle speed Va and the SC timing restricted target acceleration Gsc.

According to the SC timing restricted target acceleration map (lookup-table) MPsc, the SC timing restricted target acceleration Gsc is obtained/set as follows. When the vehicle speed Va is equal to or higher than zero and lower than a first vehicle speed V1, the SC timing restricted target acceleration Gsc is set to a first acceleration G1. When the vehicle speed Va is equal to or higher than the first vehicle speed V1 and lower than a second vehicle speed V2, the SC timing restricted target acceleration Gsc is set to a value which linearly decreases from the first acceleration G1 to zero as the vehicle speed Va increases. When the vehicle speed Va is equal to or higher than the second vehicle speed V2, the SC timing restricted target acceleration Gsc is set to zero.

The ECU 10 calculates an acceleration difference (deviation) ΔGsc (=Gsc−Ga) between the SC timing restricted target acceleration Gsc and the acceleration detected by the acceleration sensor 14. The acceleration detected by the acceleration sensor 14 may be referred to as an actual acceleration Ga. The ECU 10 calculates the SC timing restricted driving force Fsc using a feedback control theory with the acceleration difference ΔGsc. The feedback control theory used here is, for example, so called PID control theory represented by the following equation/formula (1). PID stands for Proportional-Integral-Differential.

$$Fsc = K1sc \cdot \Delta Gsc + K2sc \cdot \Sigma \Delta Gsc + K3sc \cdot d\Delta Gsc/dt \quad (1)$$

In the equation (1) above, ΣΔGsc is an integrated value of the acceleration difference ΔGsc, and the dΔGsc/dt is a derivative value of the acceleration difference ΔGsc. K1sc is a control gain for the proportional term (P term: K1sc·ΔGsc), that is a proportion gain. K2sc is a control gain for the integral term (I term: K2sc·ΣΔGsc), that is an integration gain. K3sc is a control gain for the derivative term (D term: K3sc·dΔGsc/dt), that is a derivation gain.

It should be noted that the ECU 10 may calculate the SC timing restricted driving force Fsc using a feedback control theory represented by the following equation/formula (2) which includes a feedforward control term Fscff in addition to the terms included in the right side of the PID control theory formula (1).

$$Fsc = K1sc \cdot \Delta Gsc + K2sc \cdot \Sigma \Delta Gsc + K3sc \cdot d\Delta Gsc/dt + Fscff \qquad (2)$$

The feedforward control term Fscff (or feedforward control amount Fscff) can be calculated based on the SC timing restricted target acceleration Gsc and the vehicle speed Va. For instance, the feedforward control term Fscff may be set to a driving force which is required to be applied to the driving wheels W (in actuality, the torque which the driving force generating device 20 needs to generate) in such a manner that the actual acceleration Ga of the vehicle coincides with the SC timing restricted target acceleration Gsc when the vehicle runs on a dry flat and paved road at the vehicle speed Va. More specifically, the ECU 10 has stored an unillustrated SC feedforward map (lookup-table) in the ROM which defines a relationship between "a combination of the vehicle speed Va and the SC timing restricted target acceleration Gsc" and "the feedforward control amount Fscff". The ECU 10 applies the actual combination of the vehicle speed Va and the SC timing restricted target acceleration Gsc to the SC feedforward map to calculate the feedforward control amount Fscff.

<R Timing Driving Force Restricting Control>

Generally, the driver backs the vehicle while he/she repeatedly presses and releases the brake pedal. At this time, the driver may erroneously/mistakenly operate the acceleration pedal instead of the brake pedal (against his/her intention). The brake pedal is often pressed greatly/deeply. Thus, when the acceleration pedal is mistakenly pressed instead of the brake pedal while he/she has an intention to press the brake pedal, the acceleration pedal is pressed greatly/deeply so that the vehicle may be accelerated rapidly backwards against driver's intention. The ECU 10 performs the driving force restricting control to suppress the rapid/sudden backward movement of the vehicle. This driving force restricting control may be referred to as an R timing driving force restricting control.

(R Timing Driving Force Restricting Control Execution Condition)

The ECU 10 performs the R timing driving force restricting control only in a period in which the R timing driving force restricting control execution condition is satisfied. The R timing driving force restricting control execution condition is satisfied when both of an (first) execution condition R1 and an (second) execution condition R2 are satisfied.

The execution condition R1: The state of the acceleration pedal is the operation state. In other words, the acceleration pedal operation amount Ap is equal to or larger than the acceleration pedal operation amount threshold Ap0 (Ap≥AP0).

The execution condition R2: The shift position is the R position.

(R Timing Restricted Driving Force)

When performing the R timing driving force restricting control, the ECU 10 calculates the R timing restricted driving force (as the target driving force). The R timing restricted driving force continues to be calculated as described below in a period in which the R timing driving force restricting control execution condition is satisfied. In contrast, in a period in which the R timing driving force restricting control execution condition is not satisfied, the R timing restricted driving force is set to an extraordinary large value which the driving force generated by the driving force generating device 20 can never reach.

Figure 4:
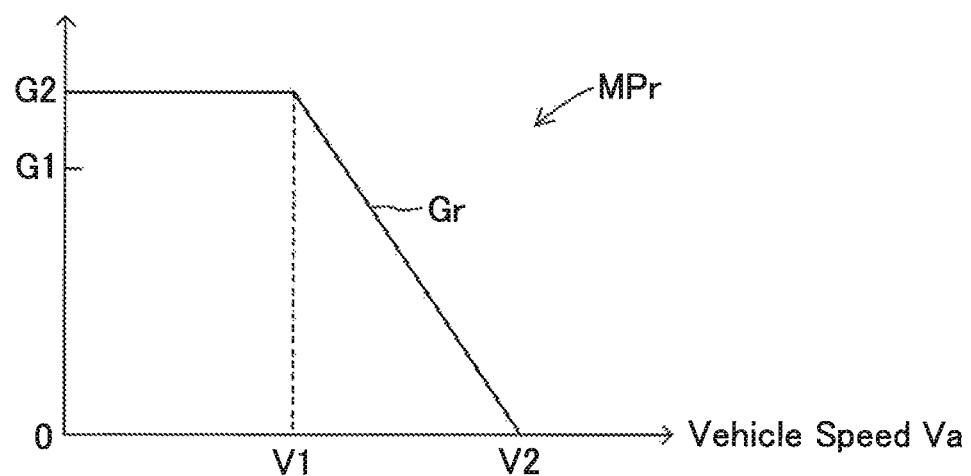
FIG. 4 is a graph showing an R timing restricted target acceleration map (look-up table).

The ECU 10 calculates an R timing restricted target acceleration Gr which is a target value of an acceleration of the vehicle in order to calculate the R timing restricted driving force. The ECU 10 has stored an R timing restricted target acceleration map (lookup-table) MPr shown in FIG. 4 in the ROM, and uses (refers to) the R timing restricted target acceleration map MPr to calculate the R timing restricted target acceleration Gr. The R timing restricted target acceleration map MPsc is a map defining a relationship between the vehicle speed Va and the R timing restricted target acceleration Gr.

According to the R timing restricted target acceleration map (lookup-table) MPr, the R timing restricted target acceleration Gr is obtained/set as follows. When the vehicle speed Va is equal to or higher than zero and lower than the first vehicle speed V1, the R timing restricted target acceleration Gr is set to a second acceleration G2. When the vehicle speed Va is equal to or higher than the first vehicle speed V1 and lower than the second vehicle speed V2, the R timing restricted target acceleration Gr is set to a value which linearly decreases from the second acceleration G2 to zero as the vehicle speed Va increases. When the vehicle speed Va is equal to or higher than the second vehicle speed V2, the R timing restricted target acceleration Gr is set to zero.

In the present embodiment, the second acceleration G2 is larger than the first acceleration G1, however, the second acceleration G2 may be equal to or smaller than the first acceleration G1. The first vehicle speed V1 of the R timing restricted target acceleration map Mpr shown in FIG. 4 may be equal to or different from the first vehicle speed V1 of the SC timing restricted target acceleration map Mpsc shown in FIG. 3. Similarly, the second vehicle speed V2 of the R timing restricted target acceleration map Mpr shown in FIG. 4 may be equal to or different from the second vehicle speed V2 of the SC timing restricted target acceleration map Mpsc shown in FIG. 3.

The ECU 10 calculates an acceleration difference (deviation) ΔGr (=Gr−|Ga|) between the R timing restricted target acceleration Gr and the magnitude (or the absolute value) of the actual acceleration detected by the acceleration sensor 14. The ECU 10 calculates the R timing restricted driving force Fr using a feedback control theory with the acceleration difference ΔGr. The feedback control theory used here is, for example, a PID control theory represented by the following equation/formula (3).

$$Fr = K1r \cdot \Delta Gr + K2r \cdot \Sigma \Delta Gr + K3r \cdot d\Delta Gr/dt \qquad (3)$$

In the equation (3) above, ΣΔGr is an integrated value of the acceleration difference ΔGr, and the dΔGr/dt is a derivative value of the acceleration difference ΔGr. K1r is a control gain for the proportional term (P term: K1r·ΔGr), that is a proportion gain. K2r is a control gain for the integral term (I term: K2r·ΣΔGr), that is an integration gain. K3r is a control gain for the derivative term (D term: K3r·d ΔGr/dt), that is a derivation gain.

The control gains K1r, K2r, and K3r are equal to, but may be different from the control gains K1sc, K2sc, and K3sc, respectively. Each of the control gain K1r used in the equation for the R timing restricted driving force Fr and the control gain K1sc used in the equation for the SC timing restricted driving force Fsc is varied/adjusted/changed depending on a road inclination θ, as described later.

It should be noted that the ECU 10 may calculate the R timing restricted driving force Fr using a feedback control theory represented by the following equation/formula (4) which includes a feedforward control term Frff in addition to the terms included in the right side of the PID control theory formula (3).

$$Fr=K1r \cdot \Delta Gr + K2r \cdot \Sigma \Delta Gr + K3r \cdot d\Delta Gr/dt + Frff \qquad (4)$$

The feedforward control term Frff (or feedforward control amount Frff) can be calculated based on the R timing restricted target acceleration Gr and the vehicle speed Va. For instance, the feedforward control term Frff may be set to a driving force which is required to be applied to the driving wheels W (in actuality, the torque which the driving force generating device 20 needs to generate) in such a manner that the actual acceleration Ga of the vehicle coincides with the R timing restricted target acceleration Gr when the vehicle runs on the dry flat and paved road at the vehicle speed Va. More specifically, the ECU 10 has stored an unillustrated R feedforward map (lookup-table) in the ROM which defines a relationship between "a combination of the vehicle speed Va and the R timing restricted target acceleration Gr" and "the feedforward control amount Frff". The ECU 10 applies the actual combination of the vehicle speed Va and the R timing restricted target acceleration Gr to the R feedforward map to calculate the feedforward control amount Frff.

<Final Target Driving Force>

The ECU 10 performs the driving force restricting control when the specific condition is satisfied. More specifically, the ECU 10 executes the SC timing driving force restricting control when the shift changing timing specific condition is satisfied (in the period from the time point at which the SC timing driving force restricting control start condition becomes satisfied to the time point at which the SC timing driving force restricting control end condition becomes satisfied), and executes the R timing driving force restricting control when the backward moving timing specific condition is satisfied (in the period in which the R driving force restricting control execution condition is satisfied). Therefore, when both of the shift changing timing specific condition and the backward moving timing specific condition are satisfied, both of the SC timing driving force restricting control and the R timing driving force restricting control are executed. The ECU 10 calculates the SC timing restricted driving force Fsc when executing the SC timing driving force restricting control, and calculates the R timing restricted driving force Fr when executing the R timing driving force restricting control.

Furthermore, the ECU 10 selects, as the final target driving force Ftgt, the smallest driving force out of the pedal required driving force Fp, the SC timing restricted driving force Fsc, and the R timing restricted driving force Fr, and controls the actuator 21 in such a manner that the actual driving force coincides with the final target driving force Ftgt.

It should be noted that, when the SC timing driving force restricting control is being executed but the R timing driving force restricting control is not being executed, the R timing restricted driving force Fr is set to the extraordinary large value which the driving force generated by the driving force generating device 20 can never reach. Therefore, in this case, one of the pedal required driving force Fp and the SC timing restricted driving force Fsc, whichever is smaller, is selected as the final target driving force Ftgt.

Similarly, when the R timing driving force restricting control is being executed but the SC timing driving force restricting control is not being executed, the SC timing restricted driving force Fsc is set to the extraordinary large value which the driving force generated by the driving force generating device 20 can never reach. Therefore, in this case, one of the pedal required driving force Fp and the R timing restricted driving force Fr, whichever is smaller, is selected as the final target driving force Ftgt.

In the above manner, the driving force restricting control (the SC timing driving force restricting control and/or the R timing driving force restricting control) is executed so that the driving force generated by the driving force generating device 20 is restricted/limited when the driver performs unintentional acceleration pedal operation (the excessive pressing of the acceleration pedal or the mistaken pressing of the acceleration pedal). Consequently, the sudden start moving of the vehicle and the sudden/excessive acceleration of the vehicle can be prevented.

<Adjustment of the Proportion Gains>

The driving force restricting control is executed when the specific operation is detected, not only in a case where the vehicle is running on the flat road but also in a case where the vehicle is running on the inclined road (ascending slope). When the driving force restricting control is executed while the vehicle is on the inclined road (inclined road to climb up, ascending slope), not only the driving force is restricted but also a gravity force component toward the descending direction due to a weight of the vehicle is applied to the vehicle. Assuming that the control gains of the feedback control described above have been set/determined in advance such that the control gains are suitable for the flat road, hunting (fluctuation) of the feedback control amount occurs. Consequently, hunting (fluctuation) of the vehicle speed occurs when the vehicle is on the ascending slope.

Figure 5A:
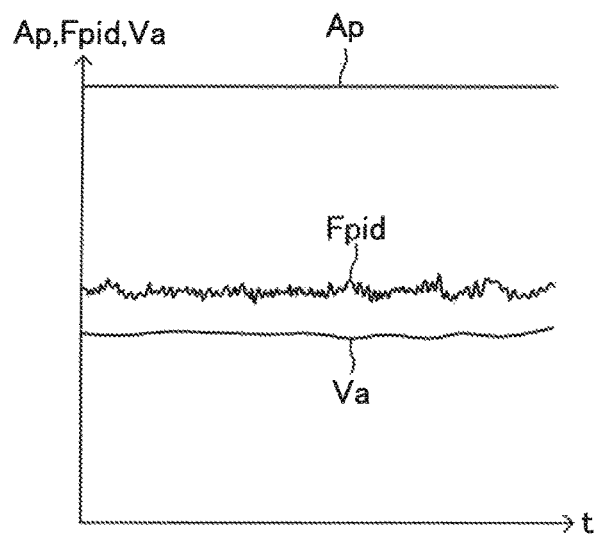
FIG. 5A and FIG. 5B is a chart showing a vehicle speed, a PID control driving force, and an acceleration pedal operation amount, when the proportion gain is relatively large.
Figure 5B:
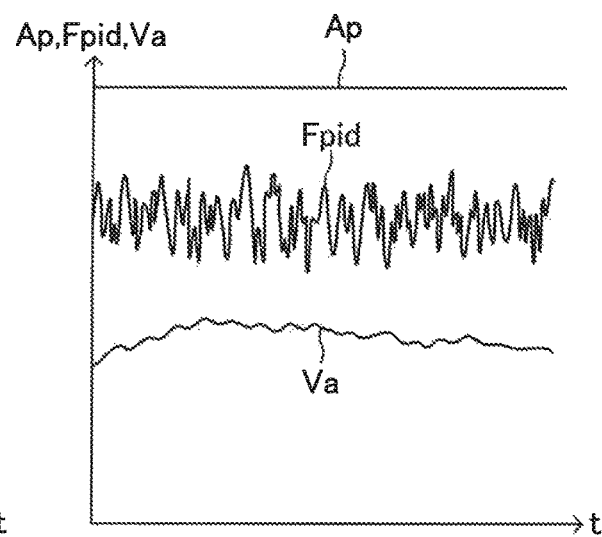
Figure 6A:
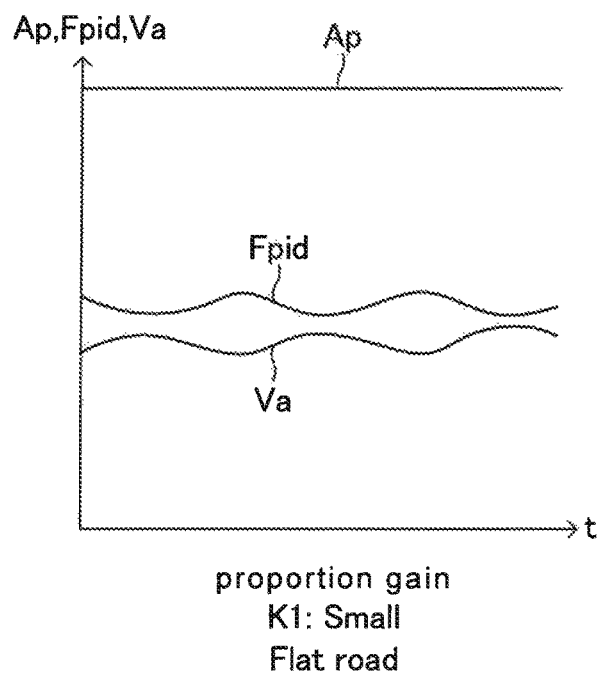
FIG. 6A and FIG. 6B is a chart showing the vehicle speed, the PID control driving force, and the acceleration pedal operation amount, when the proportion gain is relatively small.
Figure 6B:
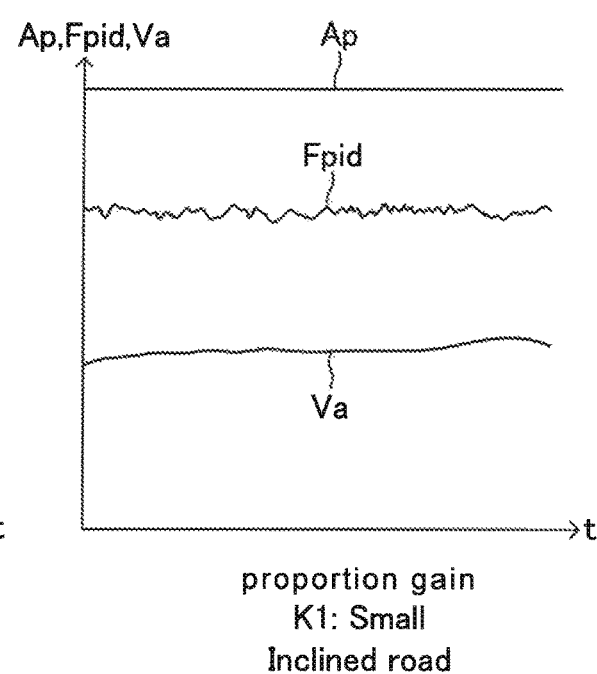

Each of FIGS. 5A, 5B, 6A and 6B shows the vehicle speed Va, a PID control driving force Fpid, and the acceleration pedal operation amount Ap. FIGS. 5A and 5B is an example of those parameters when the proportion gain K1 is set to a relatively large value K1A, and FIGS. 6A and 6B is an example of those parameters when the proportion gain K1 is set to a relatively small value K1B (i.e., K1A>K1B). In each of FIGS. 5A and 6A, shows an example of those parameters when the vehicle is on the flat road, and FIGS. 5B and 6B shows an example of those parameters when the vehicle is on the ascending road. In those figures, the abscissa corresponds to time. Charts shown in FIGS. 5A, 5B, 6A and 6B employ the same scale as each other.

The PID control driving force Fpid is a control amount calculated by the feedback control theory, and thus, is the restricted driving force. The PID control driving force Fpid corresponds to the SC timing restricted driving force Fsc or the R timing restricted driving force Fr. The proportion gain K1 corresponds to the above described proportion gain K1sc or the above described proportion gain K1r.

The value K1A is a value of the proportion gain K1 which has been set/determined in such a manner that the vehicle speed Va does not fluctuate (hunting of the vehicle speed Va does not occur) when the driving force restricting control is executed on the flat road as shown in FIG. 5A. When that value K1A is used as the value of the proportion gain K1 for the driving force restricting control using the PID control described above on the ascending road, the PID control driving force Fpid fluctuates greatly, and thus, hunting (fluctuation) of the vehicle speed Va occurs (the vehicle speed Va fluctuates frequently), as shown in FIG. 5B. This means that the value K1A as the value of the proportion gain K1 is considered to be too large for the ascending road.

In contrast, when the value of the proportion gain K1 is set to the value K1B (<K1A) for the driving force restricting control using the PID control described above on the ascending road, the PID control driving force Fpid and the vehicle speed Va can be prevented from fluctuating greatly, as shown in FIG. 6B. However, in this case, the PID control driving force Fpid and the vehicle speed Va fluctuate gently on the flat road, as shown in FIG. 6A.

Figure 7:
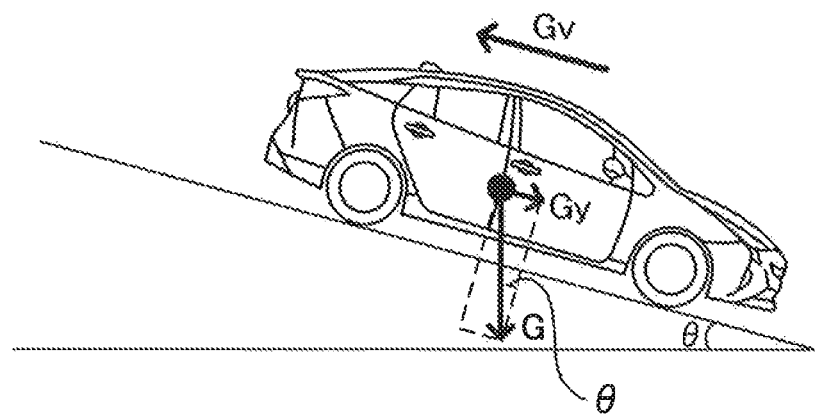
FIG. 7 is an illustration for describing a way to calculate an inclination of a running road.

In view of the above, the ECU 10 of the present embodiment detects an inclination angle (gradient) θ of the road on which the vehicle is present/running in the traveling/running direction of the vehicle (i.e., either a forward direction of the vehicle when the vehicle is moving forward or a backward direction of the vehicle when the vehicle is moving backward), and adjusts (changes) the proportion gain K1 (i.e., K1sc and K1r) based on the detected inclination angle θ in such a manner that the proportion gain K1 becomes smaller as the inclination angle θ becomes larger. The an inclination angle θ may be referred to as an inclination parameter indicative of an inclination in a vehicle traveling direction of a road on which the vehicle is present The inclination angle θ is calculated (detected) based on the acceleration Ga in the front-rear direction of the vehicle detected by the acceleration sensor 14 and the vehicle speed Va detected by the vehicle speed sensor 13. The following equations (5) and (6) work, when a gravity acceleration acting on the vehicle is G, a component in the front-rear direction of the vehicle of the gravity acceleration G is Gy, an acceleration of the vehicle that is calculated/obtained by differentiating the vehicle speed Va is Gv (=dVa/dt), as shown in FIG. 7 (where the vehicle is moving backward). Ga is the acceleration detected by the acceleration sensor 14.

$$Ga=Gv-Gy \quad (5)$$

$$Gy=G\cdot\sin\theta \quad (6)$$

From the equations (5) and (6), the inclination angle θ is calculated by the following equation (7).

$$\theta=\sin^{-1}((Gv-Ga)/G) \quad (7)$$

It should be noted that it is preferable that the value Gv be calculated based on a derivative/differential value of the wheel speed detected by the wheel speed sensor.

Figure 8:
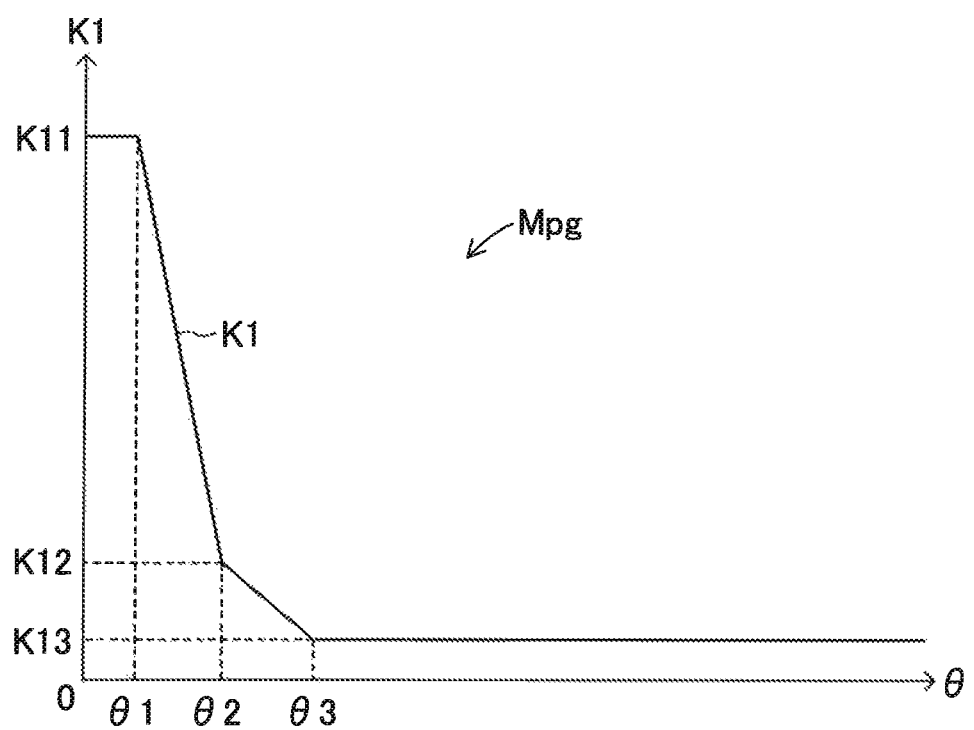
FIG. 8 is a graph showing a gain map (look-up table).

The ECU 10 calculates the proportion gain K1 in accordance with the inclination angle (ascending slope gradient) θ by referring to (using) a gain map (look-up table) MPg shown in FIG. 8 and stored in the ROM. The gain map MPg is a table defining a relationship between the inclination angle θ and the proportion gain K1.

According to the gain map MPg, the proportion gain K1 is set/determined as follows. The proportion gain K1 is set to a first gain K11 when the inclination angle θ is equal to or larger than zero and is smaller than a first inclination angle θ1. The proportion gain K1 is set in such a manner that the proportion gain K1 linearly decreases from the first gain K11 to a second gain K12 as the inclination angle θ increases when the inclination angle θ is equal to or larger than the first inclination angle θ1 and is smaller than a second inclination angle θ2. The proportion gain K1 is set in such a manner that the proportion gain K1 linearly decreases from the second gain K12 to a third gain K13 as the inclination angle θ increases when the inclination angle θ is equal to or larger than the second inclination angle θ2 and is smaller than a third inclination angle θ3. The proportion gain K1 is set to the third gain K13 when the inclination angle θ is equal to or larger than the inclination angle θ3.

It should be noted that, when the vehicle is on the descending road (i.e., an inclined road on which the vehicle is running downward), the proportion gain K1 is set to the value (i.e., the first gain K11) set/used when the vehicle is on the flat road.

The ECU 10 applies the proportion gain K1 obtained/set by referring to the gain map MPg to the PID control equation/formula described above to calculate the restricting driving force (the SC timing restricted driving force Fsc and/or the R timing restricted driving force Fr).

<Driving Force Control Routine>

Figure 9:
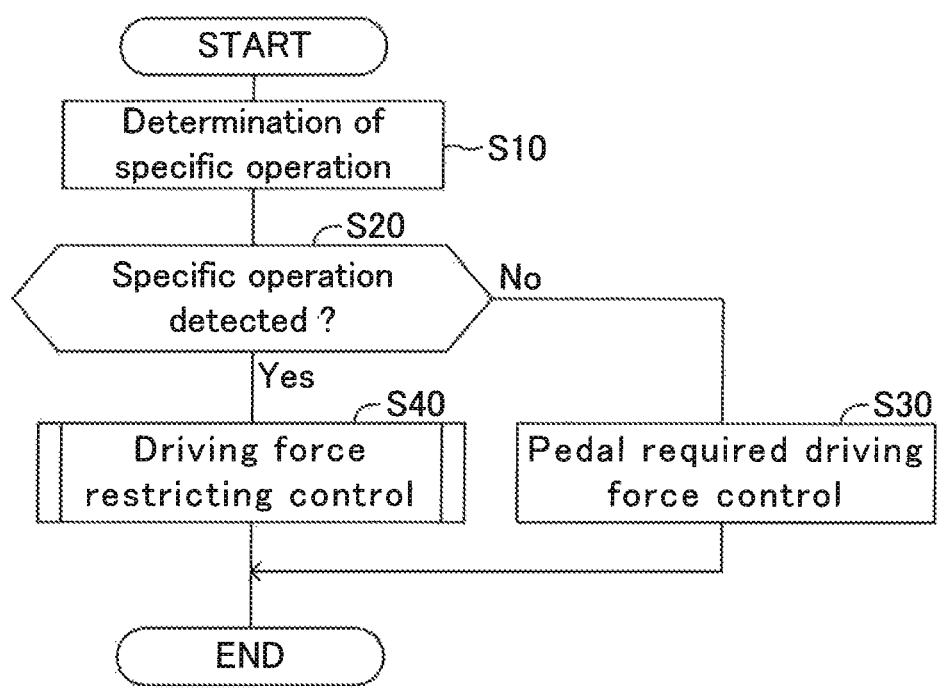
FIG. 9 is a flowchart illustrating a driving force control routine (main routine).

Processes for the driving force control will next be described with referring to flowcharts. FIG. 9 shows a flowchart describing a driving force control routine executed by the ECU 10 every time a predetermined time (calculation interval) elapses.

When the ECU 10 starts to execute the driving force control routine, the ECU 10 determines whether or not the specific operation has been performed/detected at step S10. More specifically, the ECU 10 determines whether or not the shift changing timing specific condition is satisfied and determines whether or not the backward moving timing specific condition is satisfied. The shift changing timing specific condition is the condition which is satisfied in the period from the time point at which the SC timing driving force restricting control start condition becomes satisfied to the time point at which the SC timing driving force restricting control end condition becomes satisfied. The backward moving timing specific condition is the condition which is satisfied in which the R driving force restricting control execution condition is satisfied.

When the ECU 10 determines that the specific operation has not been performed, the ECU 10 makes a No determination at step S20 to proceed to step S30. At step S30, the ECU 10 executes the pedal required driving force control. More specifically, at step S30, the ECU 10 refers to the pedal required driving force map MPp to calculate the pedal required driving force Fp, and controls the actuator 21 in such a manner that the driving force generating device 20 generates a driving force equal to the thus calculated pedal required driving force Fp.

In contrast, when the ECU 10 determines that the specific operation has been performed, the ECU 10 makes a Yes determination at step S20 to proceed to step S40. At step S40, the ECU 10 executes the driving force restricting control. For example, when it is determined that the shift changing timing specific condition has been satisfied, the ECU 10 executes the SC timing driving force restricting control. When it is determined that the backward moving timing specific condition has been satisfied, the ECU 10 executes the R timing driving force restricting control. When it is determined that both of the shift changing timing specific condition and the backward moving timing specific condition have been satisfied, the ECU 10 executes, as the driving force restricting control, both of the SC timing driving force restricting control and the R timing driving force restricting control.

Figure 10:
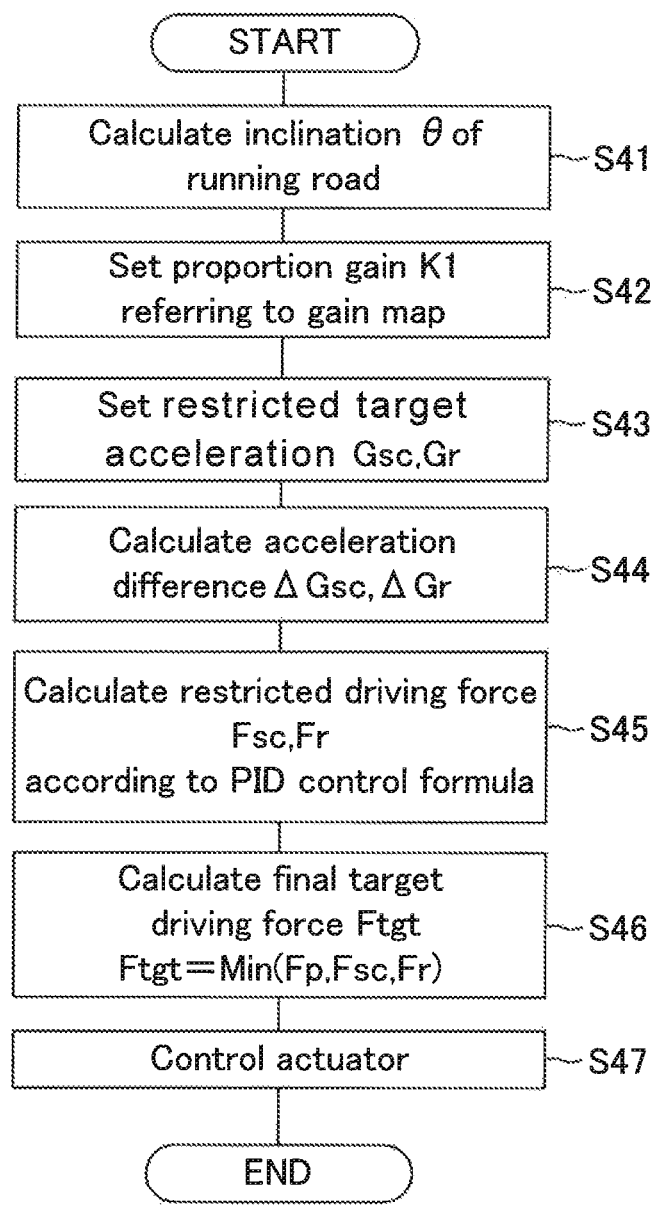
FIG. 10 is a flowchart illustrating a driving force restricting control routine (sub routine).

More specifically, the ECU 10 executes the driving force restricting control at step S40 by executing the driving force restricting routine (sub routine) shown in FIG. 10.

After starting the driving force restricting routine, the ECU 10 calculates the inclination angle θ of the road on which the vehicle is present at step S41, in the manner as described above. Subsequently, the ECU 10 determines the value of the proportion gain K1 by applying the inclination angle θ to the gain map MPg, at step S42. That is, the ECU 10 sets the value of the proportion gain K1 to a value determined in response to the inclination angle θ using the gain map MPg, at step S42. When the SC timing driving force restricting control is executed, the proportion gain K1sc is set/determined. When the R timing driving force restricting control is executed, the proportion gain K1r is set/determined.

Subsequently, the ECU 10 calculates the restricted target acceleration (Gsc, Gr) using the restricted target acceleration map (MPsc, MPr) at step S43. Specifically, the EUC 10 calculates the SC timing restricted target acceleration Gsc using the SC timing restricted target acceleration map MPsc and the calculated restricted target acceleration Gsc when the ECU 10 executes the SC timing driving force restricting control at step S43. The ECU 10 calculates the R timing restricted target acceleration Gr using the R timing restricted target acceleration map MPr and the calculated restricted target acceleration Gr when the ECU 10 executes the R timing driving force restricting control at step S43.

Subsequently, the ECU 10 calculates the acceleration difference/deviation (ΔGsc,ΔGsc) that is a difference between the restricted target acceleration (Gsc, Gr) and the actual acceleration (Ga) at step S44. Specifically, the ECU 10 calculates the acceleration difference ΔGsc which is the difference between the SC timing restricted target acceleration Gsc and the actual acceleration Ga when the ECU 10 executes the SC timing driving force restricting control at step S44. the ECU 10 calculates the acceleration difference ΔGr which is the difference between the R timing restricted target acceleration Gr and the actual acceleration Ga when the ECU 10 executes the R timing driving force restricting control at step S44.

Subsequently, the ECU 10 applies the value of the proportion gain K1 and the acceleration difference/deviation (ΔGsc,ΔGsc) to the above described PID control equation(s)/formula(s) so as to calculate the restricted driving force (Fsc, Fr) at step S45. Specifically, the ECU 10 calculates the SC timing restricted driving force Fsc when the ECU 10 executes the SC timing driving force restricting control at step S45. the ECU 10 calculates the R timing restricted driving force Fr when the ECU 10 executes the R timing driving force restricting control at step S45.

Subsequently, at step S46, the ECU 10 selects the smallest value among the pedal required driving force Fp, the SC timing restricted driving force Fsc, and the R timing restricted driving force Fr, and then, employs the selected smallest value as the final target driving force Ftgt. Therefore, a force obtained by limiting the pedal required driving force Fp to one of the SC timing restricted driving force Fsc, and the R timing restricted driving force Fr, whichever is smaller, is used as the final target driving force Ftgt. It should be noted that the pedal required driving force Fp is calculated at step S46 or may be calculated at unillustrated different step.

Subsequently, the ECU 10 controls the actuator 21 in such a manner that the actual driving force generated by the driving force generating device 20 becomes equal to the final target driving force Ftgt, at step S47.

After the ECU 10 executes the process of step S47, it terminates the driving force restraining control sub routine and goes back to the driving force control routine which is a main routine.

After the ECU 10 executes the process of either one of step S30 and step S40, it tentatively terminates the driving force control routine. The ECU repeats the driving force control routine every time the predetermined time elapses.

FIGS. 11A and 11B shows the vehicle speed Va, the PID control driving force Fpid, and the acceleration pedal operation amount Ap, in a case where the proportion gain K1 is adjusted/changed in accordance with the inclination angle θ as described above, wherein FIG. 11A) shows an example of those parameters when the road on which the vehicle is present is the flat road, and FIG. 11B shows an example of those parameters when the road on which the vehicle is present is the ascending road. The charts shown in FIGS. 11A and 11B employ the same scale as those shown in FIGS. 5A, 5B, 6A and 6B. As understood from FIGS. 11A and 11B, no/little hunting/fluctuation of the vehicle speed Va occurs on the flat road as well as on the ascending road.

As described above, the driving force control apparatus of the vehicle according to the present embodiment adjusts/changes the proportion gain of the PID control equation/formula for calculating the restricted driving force base on the magnitude of the inclination angle (which is referred to as an inclination parameter indicative of an inclination in a vehicle traveling direction of a road on which the vehicle is present) θ of the road in such a manner that the proportion gain for the relatively large magnitude of the inclination angle θ of the road (i.e., a value of the control gain used when the inclination parameter is a first magnitude) is smaller than the proportion gain for the relatively small magnitude of the inclination angle θ of the road (i.e., a value of the control gain used when the inclination parameter is a second magnitude smaller than the first magnitude). This allows the apparatus to secure the preferable controllability of the driving force restricting control on both of the flat road and the ascending road. Accordingly, hunting/fluctuation of the vehicle speed can be reduced/suppressed on both of the flat road and the ascending road.

In addition, the target restricted driving force is calculated based on the PID control formula using the difference between the actual acceleration and the restricted target acceleration which varies depending on the vehicle speed. Thus, the restricted driving force can be obtained appropriately.

The final target driving force is set to one of the restricted driving force and the pedal required driving force control, whichever is smaller. Therefore, the restricted driving force control can be performed with the appropriate target driving force.

The driving force control apparatus of the vehicle according to the present embodiment has been described, however, the present invention is not limited to the above embodiment, and various modifications can be employed within the scope of the present invention.

For example, in the above embodiment, two types of driving force restricting controls (namely, the SC timing driving force restricting control and the R timing driving force restricting control) are performed, however, the driving force restricting control is not limited to those. That is, only one of those two can be executed, or another type of the driving force restricting control can be executed, as the driving force restricting control to which the present invention is applied.

In the above embodiment, the integration gain K2 (K2sc, K2r) and the derivation gain K3 (K3sc, K3r) are not adjusted in accordance with the inclination angle (gradient) θ of the road. However, the integration gain K2 (K2sc, K2r) and/or the derivation gain K3 (K3sc, K3r) may also be adjusted in accordance with the inclination angle (gradient) θ of the road.

It should be also noted that "the pedal required driving force map MPp, the SC timing restricted target acceleration map Mpsc, the R timing restricted target acceleration map MPr, and the gain map MPg" used in the above embodiment are mere examples, and their properties can be arbitrarily set. For instance, the gain map MPg may have a property that defines the proportion gain K1 in such a manner that the proportion gain K1 becomes smaller in a stepwise fashion as the inclination angle (gradient) θ becomes larger. In other words, the proportion gain K1 may be set in such a manner that a value of the proportion gain K1 set when the inclination angle (gradient) θ is equal to or larger than an arbitrary angle θref is smaller than a value of the proportion gain K1 set when the inclination angle (gradient) 8 is smaller than the arbitrary angle θref.

Furthermore, the gain map MPg used for the SC timing driving force restricting control and the gain map MPg used for the R timing driving force restricting control may be different from each other.

What is claimed is:

1. A driving force control apparatus of a vehicle comprising:
a driving force generating device configured to generate a driving force applied to said vehicle; and
a control unit configured to control said driving force generating device to make said driving force generating device generate a driving force equal to a pedal required driving force which is a target driving force varied depending on an acceleration pedal operation amount,
said control unit being configured to:
detect a specific operation by a driver, said specific operation being an operation which has a probability of causing said vehicle to make a movement which is not along an expectation of said driver and has been defined in advance;
calculate a restricted driving force for imposing a limitation on said pedal required driving force, based on a feedback control formula which uses a difference between a target value of a moving state parameter indicative of a moving state of said vehicle and an actual value of said moving state parameter;
perform a driving force restricting control to control said driving force generating device in such a manner that said driving force generated by said driving force generating device does not exceed said calculated restricted driving force, when said specific operation is detected,
wherein,
said control unit is further configured to:
acquiring an inclination parameter indicative of an inclination in a vehicle traveling direction of a road on which said vehicle is present; and
adjusting a control gain employed in said feedback control formula based on said inclination parameter in such a manner that a value of said control gain used when said inclination parameter is a first magnitude is smaller than a value of said control gain used when said inclination parameter is a second magnitude smaller than said first magnitude.

2. The driving force control apparatus according to claim 1, wherein,
said control unit is configured to:
employ, as said feedback control formula, a Proportional-Integral-Differential control formula; and
adjust, a proportion gain serving as said control gain for a proportional term included in said Proportional-Integral-Differential control formula.

3. The driving force control apparatus according to claim 1, wherein,
said control unit is configured to:
employ, as said moving state parameter, an acceleration of said vehicle; and
determine said target value of said moving state parameter based on a speed of said vehicle.

4. The driving force control apparatus according to claim 2, wherein,
said control unit is configured to:
employ, as said moving state parameter, an acceleration of said vehicle; and
determine said target value of said moving state parameter based on a speed of said vehicle.

5. The driving force control apparatus according to claim 1, wherein,
said control unit is configured to:
select, as a final target driving force, said pedal required driving force or said restricted driving force, whichever is smaller; and
perform said driving force restricting control by causing said driving force generating device to generate a driving force equal to said selected final target driving force.

6. The driving force control apparatus according to claim 2, wherein,
said control unit is configured to:
select, as a final target driving force, said pedal required driving force or said restricted driving force, whichever is smaller; and
perform said driving force restricting control by causing said driving force generating device to generate a driving force equal to said selected final target driving force.

7. The driving force control apparatus according to claim 3, wherein,
said control unit is configured to:
select, as a final target driving force, said pedal required driving force or said restricted driving force, whichever is smaller; and
perform said driving force restricting control by causing said driving force generating device to generate a driving force equal to said selected final target driving force.

8. The driving force control apparatus according to claim 4, wherein,
said control unit is configured to:
select, as a final target driving force, said pedal required driving force or said restricted driving force, whichever is smaller; and
perform said driving force restricting control by causing said driving force generating device to generate a driving force equal to said selected final target driving force.

* * * * *